United States Patent [19]
Birkner

[11] 3,917,975
[45] Nov. 4, 1975

[54] STROBE LIGHT
[75] Inventor: Franz X. Birkner, Newton Highlands, Mass.
[73] Assignee: Subsea Products, Inc., San Diego, Calif.
[22] Filed: Nov. 19, 1973
[21] Appl. No.: 417,419

[52] U.S. Cl............ 315/200 R; 315/205; 315/208; 315/241 P; 321/8 R
[51] Int. Cl............................................ H05b 37/02
[58] Field of Search............ 315/200 A, 200 R, 205, 315/208, 241 R, 241 P; 321/8 R, 15

[56] References Cited
UNITED STATES PATENTS
2,777,107  1/1957  Medlar.............................. 321/8 R
3,526,821  9/1970  Thomas............................ 321/15 X Primary Examiner—James B. Mullins
Attorney, Agent, or Firm—Ellsworth R. Roston

[57] ABSTRACT

A strobe light for use in photography having a low voltage d-c source of energy which is used to provide a charging of high voltage capacitors and with the discharge of the high voltage capacitors through a xenon light producing the output strobe light. The capacitors are charged in steps, such as a first step of one-half of the maximum voltage, and with a second step at the full maximum voltage to increase the efficiency of the charging and the speed of the charging and with a particular switching matrix to provide switching between the different steps in the charging of the capacitors. The switching matrix operates in conjunction with a conventional center tap fullwave rectifier design and uses only a minimal number of additional components; specifically, a diode and switch.

14 Claims, 7 Drawing Figures

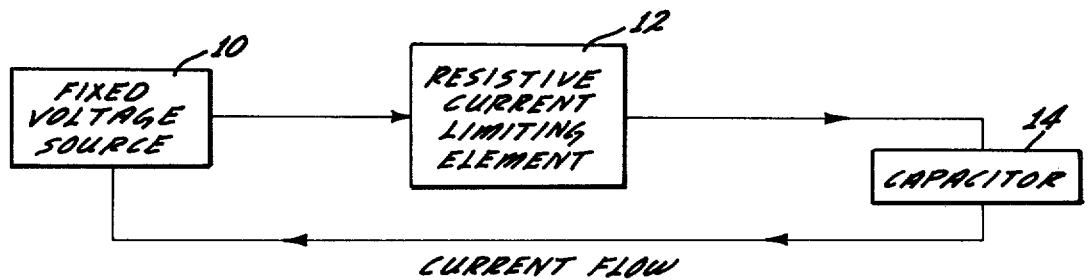
FIG.1
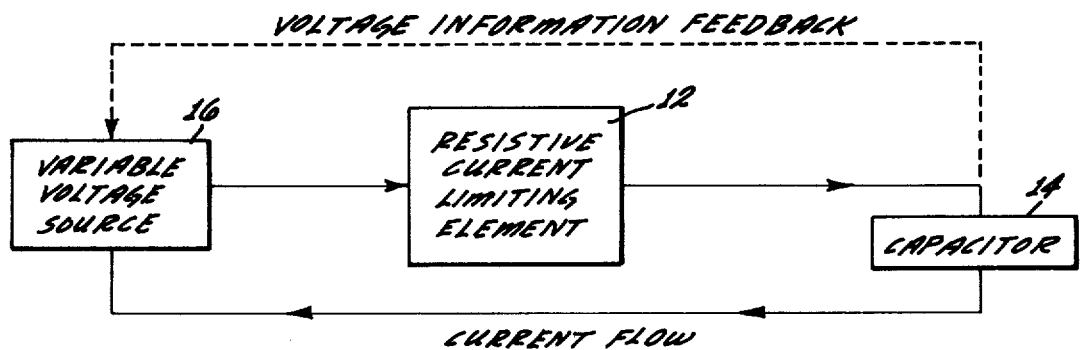
FIG.2
FIG.3
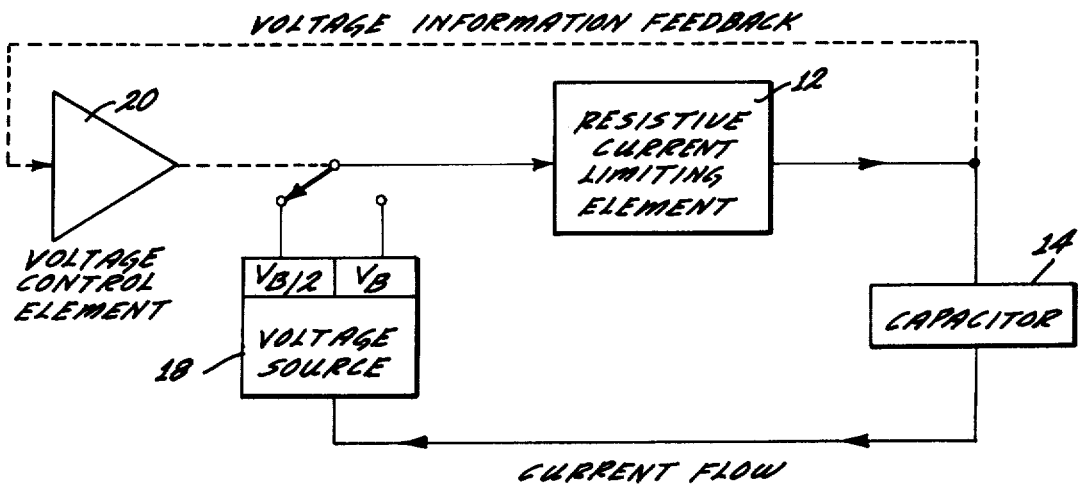

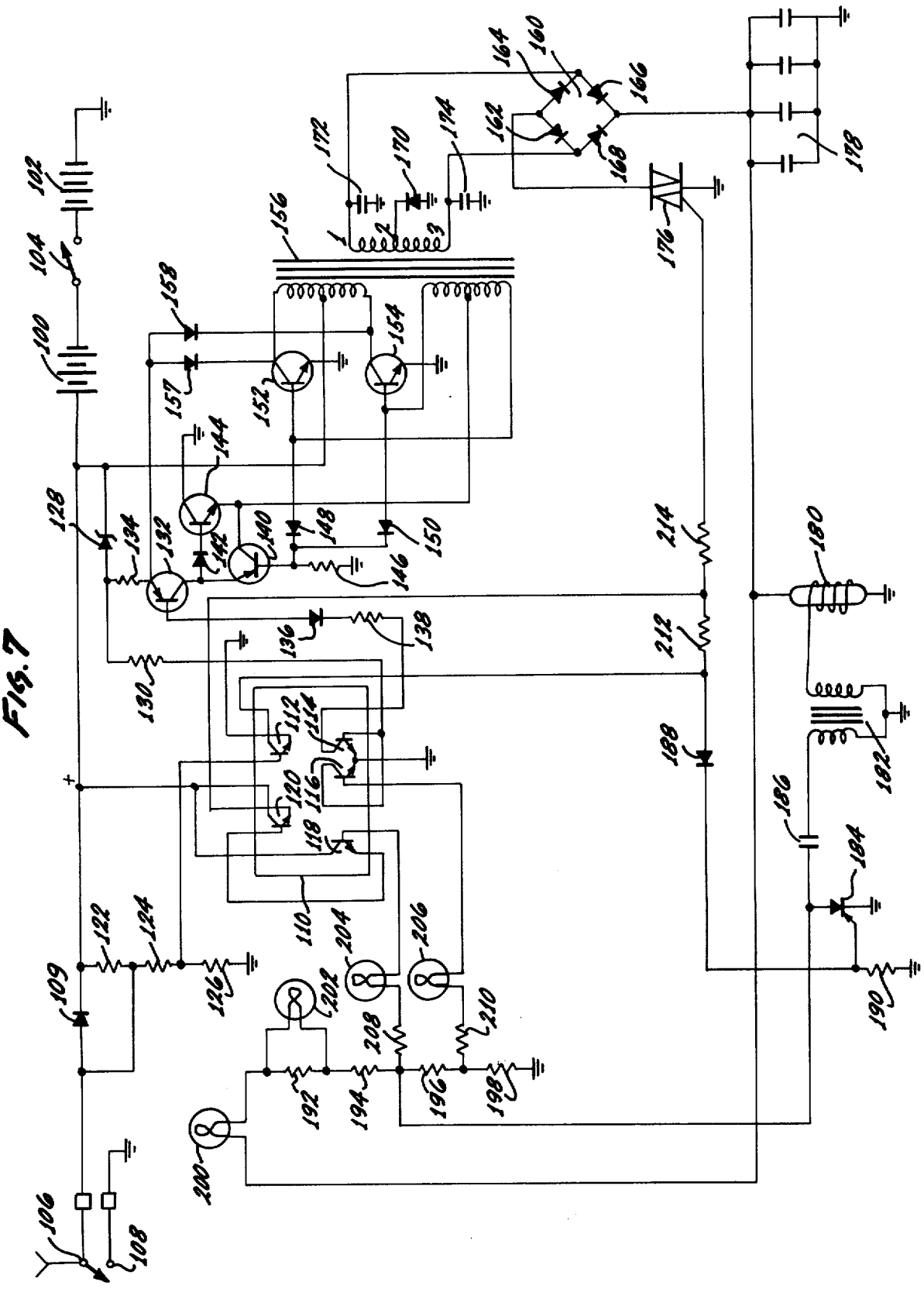

STROBE LIGHT

The present invention is directed to a strobe light for use in photography. The strobe light of the present invention has particular adaptability for use in underwater environments, but may also be used in normal photographic situations other than underwater.

The strobe light of the present invention is portable in that the strobe provides a number of output flashes from a self-contained unit and with the power sources, which are batteries periodically recharged, to renew the use of the strobe. The batteries are rechargeable low voltage batteries, even though the output light source is designed to operate from a high voltage. The low voltage batteries are therefore used to power an oscillator to produce an a-c voltage. This a-c voltage is stepped up to a high voltage which is to be used to charge a bank of high voltage capacitors. The high voltage a-c is first rectified to a high voltage d-c which is used to charge the bank of capacitors, which high voltage capacitors provide the power to flash the strobe light.

One of the difficulties of many prior art strobe lights is that they use high voltage batteries which are bulky and not rechargeable. The present invention uses low voltage, rechargeable batteries which operate very efficiently in charging the capacitors so as to provide for a relatively large number of flashes before the batteries have to be recharged. The charging of the high voltage capacitors is accomplished by charging the capacitors in a number of steps of progressively higher voltages, rather than merely applying a fixed voltage across the capacitors and having the capacitors charged to that fixed voltage. The present invention thereby provides a greater efficiency and speed in the charging of a capacitor by first applying a fixed voltage at a first level lower than the maximum voltage level and initially charging the capacitor to this first level. The charging voltage is then switched to a higher or second level to continue to charge the capacitor. Ideally, a large number of steps would be used to provide for maximum efficiency in the charging of the capacitor and also to improvide the speed of charging but, as a practical matter in the strobe light of the present invention, the back of capacitors is charged in a two-step operation.

The present invention also includes an improved switching matrix to provide for the two-step charging of the bank of capacitors, which switching matrix is simple in construction and requires a minimum number of additional components in the system. Since the strobe light of the present invention includes a rectifier circuit to rectify the high voltage a-c to a high voltage d-c, the present invention provides for a switching matrix which uses an additional diode and switch to provide for the two step voltage used in the charging of the capacitors.

The present invention, therefore, provides for an improved rechargeable strobe light which provides for a large number of output flashes before recharging is necessary and which has an improved efficiency and speed in the charging of the capacitor so as to reduce the time increment necessary between each use of the strobe light. A greater understanding of the invention will be had with reference to the following description and drawings wherein:

FIG. 1 illustrates a block diagram of a typical system used in charging a capacitor;

FIG. 2 illustrates a block diagram of an improved capacitor charging system using a feedback signal;

FIG. 3 illustrates a block diagram of a two-step capacitor charging system;

FIG. 7 illustrates a strobe light of the present invention incorporating the switching matrix providing for step charging of the high voltage capacitors.

Figure 4:
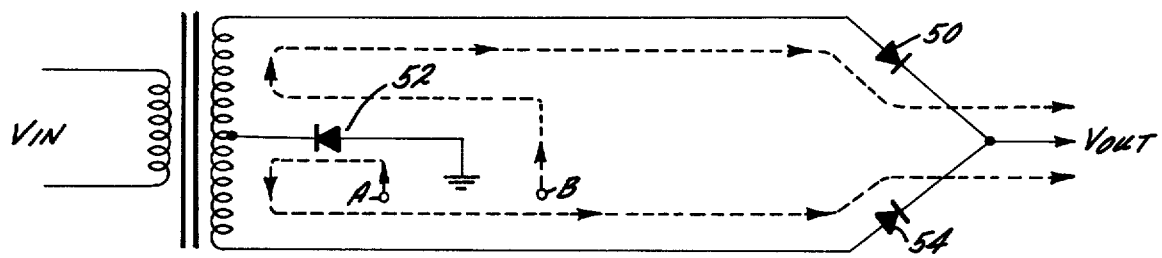
FIG. 4 illustrates a schematic of a center tapped rectifier.

Referring to FIG. 1, there is illustrated a block diagram of the typical system employed to charge a capacitor. Specifically, this system includes a fixed voltage source 10 and a resistive current limiting element 12 used to charge a capacitor 14 by current flow. In charging the capacitor 14 from zero volts to a voltage level equal to that of the fixed source 10, the theoretical efficiency of the process is a maximum of 50 percent. This efficiency level is because the energy dissipated as heat in the resistive element 12 is always equal to the energy stored in capacitor 14. This fifty percent efficiency level may be seen from the following mathematical analysis:

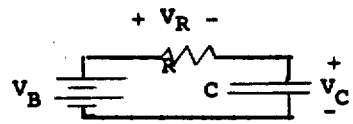

$$V_c = V_B [1 - e^{-t/RC}]$$
$$V_R = V_B - V_C = V_B e^{-t/RC}$$

$$\text{power}_R = \frac{V_R^2}{R}$$

$$\text{energy}_R = \int_0^\infty \frac{V_R^2}{R} dt = \frac{V_B^2}{R} \int_0^\infty e^{\frac{-2t}{RC}} dt$$

$$\text{energy}_R = \frac{V_B^2}{R} \cdot -\left(\frac{RC}{2}\right) e^{\frac{-2t}{RC}} \Big|_0^\infty = \frac{V_B^2 C}{2}$$

and $\text{energy}_C = \frac{V_B^2 C}{2}$ [By definition.]

$$\text{energy}_{battery} = \int_0^\infty V_B i(t) dt = V_B \int_0^\infty \frac{V_B}{R} e^{\frac{-t}{RC}} dt$$

$$\text{energy}_B = -V_B^2 C \, e^{\frac{-t}{RC}} \Big|_0^\infty = V_B^2 C$$

∴ 50% efficient

The capacitive charging efficiency may be substantially improved through the use of a step capacitor charging system. A block diagram of this system appears in FIG. 2. In the system of FIG. 2, a feedback loop is added which controls a variable voltage source 16 in place of the fixed voltage source of FIG. 1. The feedback loop is employed to continuously or incrementally adjust the output of the voltage source 16 in order to reduce the voltage differential between the capacitor 14 and the source 16. Since any reduction in the voltage differential reduces the voltage across the resistive current limiting element 12, the energy lost through dissipation in the resistive element 12 as heat is reduced, and the overall charging system efficiency is increased.

A very substantial improvement in efficiency may be realized through the use of simple step charging, even as low in number as two steps. For example, FIG. 3 illustrates a two-step capacitor charging system. The capacitor 14 is charged from a voltage source 18 having two fixed outputs of $V_B/2$ and $V_B$. A simple voltage control element 20 selects the $V_B/2$ output when the capacitor voltage is less than $V_B/2$ and the voltage controlled element 20 selects the $V_b$ output when the capacitor voltage equals or exceeds $V_B/2$. Assuming that we are charging the capacitor from a zero volt condition to a final value of $V_B$, the overall charging efficiency is increased to 67 percent, as contrasted with the 50 percent efficiency of the system of FIG. 1. This, therefore, represents a 33 percent improvement over the efficiency of the normal charging process as described with reference to FIG. 1. The total useful energy of the voltage source is, therefore, increased by 33 percent and the heat generated and dissipated is reduced by 50 percent. This can be seen from the following mathematical analysis: Assume two steps:

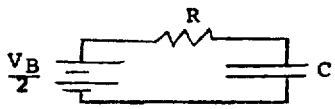

$t = 0 \rightarrow \infty$ $V_c = 0 \rightarrow \dfrac{V_B}{2}$ energy dissipated = energy stored = $\left(\dfrac{V_B}{2}\right)^2 \dfrac{C}{2} = \dfrac{V_B^2 C}{8}$ IN STEP 1 capacitive energy = $\dfrac{C_v^2}{2}$ in general case

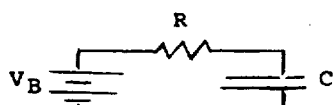

$t = 0 \rightarrow \infty$ $V_c = \dfrac{V_B}{2} \rightarrow V_B$ defining, $V_c = \dfrac{V_B}{2}$ energy stored during charge step 2 $= \dfrac{V_B^2 C}{2} - \dfrac{V_B^2 C}{8} = \dfrac{3}{8} V_B^2 C$ during step 2, energy dissipated is $V_R i_R$ as $V_R$ approaches 0 from $V_B/2$

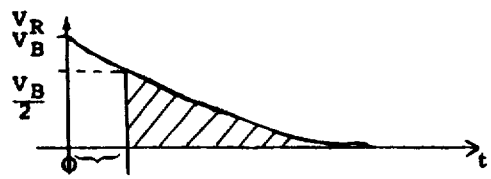

energy dissipated = $\displaystyle\int^{\infty} \dfrac{V_R(t)^2}{R} dt = \dfrac{V_B^2}{R} \int_t^{\infty} e^{\dfrac{-2t}{RC}}$ $t_1 = t\left(V_R = \dfrac{V_B}{2}\right)$ $\qquad \left(V_R = \dfrac{V_B}{2}\right)^{dt}$ when $V_R = \dfrac{V_B}{2}$, $\dfrac{V_B}{2} = V_B e^{\dfrac{-t_1}{RC}}$ $\dfrac{1}{2} = e^{\dfrac{-t_1}{RC}}$ $t_1 = -RC \ln \dfrac{1}{2}$ energy dissipated = $\dfrac{V_B^2}{R} \displaystyle\int_{-RC\ln\frac{1}{2}}^{\infty} e^{\dfrac{-2t}{RC}} dt$ energy dissipated = $\dfrac{V_B^2}{R} \left[\dfrac{-RC}{2}\right] e^{\dfrac{-2t}{RC}} \Big|_{-RC\ln\sqrt{\frac{1}{2}}}^{\infty}$ energy dissipated = $\dfrac{-V_B^2 C}{R} \left[0 - e^{\dfrac{2RC\ln 1/2}{RC}}\right]$ energy dissipated = $\dfrac{-V_B^2 C}{2} \left[e^{\ln 1/2}\right]^2 = \dfrac{V_B^2 C}{8}$ IN STEP 2

WITH TWO-STEP CHARGING:

$$\text{total energy dissipated} = \frac{V_B{}^2 C}{4}$$

$$\text{total energy stored} = \frac{V_B{}^2 C}{2}$$

VERSUS SINGLE STEP:

$$\text{total energy dissipated} = \frac{V_B{}^2 C}{2}$$

$$\text{total energy stored} = \frac{V_B{}^2 C}{2}$$

Power dissipated is reduced by 50 percent.
Useful energy is increased by 50 percent.

An additional advantage of a step charging system is a reduced time interval required to charge the capacitor when operating from a voltage source of fixed maximum power output, such as a battery. Since the output power is equal to output voltage multiplied by output current, the lower output voltages employed during all but the last charging step enable the use of a larger output current than is permissible when full output voltage is employed. Since the capacitor charge rate is proportional to current flow, a reduced charging time results. For example, the two-step charging system described above yields a 36 percent decrease in total charge time when compared with a conventional constant voltage system. This reduction corresponds to a 57 percent increase in the charge rate.

The improvements in charging efficiency and charge rate, which are realized in a two-step charging system described above, may be enhanced through the use of additional steps or increments. Eventually, as the number of steps approaches infinity, the step charging system will yield 100 percent efficiency and a charge rate limited only by the maximum output power of the voltage source. For example, the efficiencies in charge rates, which correspond to higher numbers of steps, are given below.

| Number of Steps, N | Efficiency | Charge Time (Normalized) |
|---|---|---|
| 1 (Conventional System) | 50% | 1.0 |
| 2 | 67% | .64 |
| 3 | 75% | .49 |
| 4 | 80% | .40 |
| 5 | 83% | |
| 10 | 91% | |
| N | $\frac{N}{N+1}$ | |
| ∞ (Continuous control of supply voltage) | 100% | .18 |

Figure 5:
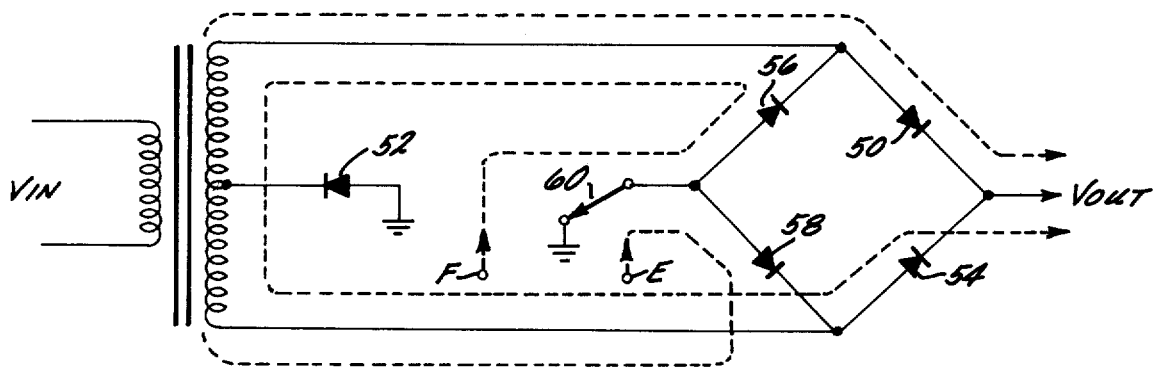
FIG. 5 illustrates the circuit of FIG. 4 with a pair of additional diodes and a switch.

In order to provide for the step charging of a capacitor, it is desirable to provide for a step voltage output which is simple in construction and will not appreciably add to the cost of the charging circuit. A simple power supply, which provides two output levels, is therefore a desirable feature of the strobe of the present invention. FIGS. 4 and 5 illustrate the design and operation of a dual voltage switching matrix. FIG. 4 illustrates a center tapped voltage rectifier. Assuming first an alternating current input applied to a primary winding $N_1$. When an a-c input is positive-going, for example, as referenced from input 1 to input 2 of primary winding $N_1$, a positive voltage is induced at point 3 of the secondary winding and a negative voltage is induced at point 4 of the secondary winding. Diodes 50 and 52 are then forward biased and a current flow is possible along a path designated B, which includes the diode 52, the $N_2$ portion of the secondary winding, the diode 50, and an external load not shown. As diode 54 is reverse-biased, no flow would occur through the path designated A. When the alternating current input reverses polarity, then a current flow occurs along path A, which includes diode 52, the $N_3$ portion of the secondary winding, diode 54, and an external load. The path B would be cut off when the current input reverses polarity.

From the above description of FIG. 4, it can be seen that fullwave rectification occurs and the magnitude of the output voltage is related to the input voltage according to the following equation:

$$V_{out} = V_{in} \times \frac{N_2}{N_1} = V_{in} \times \frac{N_3}{N_1},$$

where $N_2 = N_3$.

Referring now to FIG. 5, which additionally includes diodes 56 and 58 and a switch 60, as contrasted with the circuit of FIG. 4. When the input $V_{in}$ to the primary winding $N_1$ is positive-going, a positive voltage is again induced from point 3 to point 4 of the secondary winding. In this case, the current path is along a path designated as E, which passes through both secondary windings $N_2$ and $N_3$, when the switch 60 is in the position shown in FIG. 5. Since the point 4 of the secondary winding is essentially at ground potential, point 5, which is the center tap of the secondary transformer, is positive with respect to ground, and the diode 52 is biased off. When the input $V_{in}$ goes negative and reverses, then diodes 50 and 58 are reverse biased and diodes 54 and 56 are forward biased. The current path then travels through diodes 56 and secondary windings $N_2$ and $N_3$ and finally through diode 54 to the output. The diode 52 remains biased off. This second path is designated F.

For the system of FIG. 5 and with the switch as shown in FIG. 5, fullwave rectification occurs, and the magnitude of the output voltage is related to the input voltage according to the following equation:

$$V_{out} = V_{in} \times \frac{N_2 + N_3}{N_1}.$$

Comparing the output voltage of FIG. 5 with that of FIG. 4, we obtain the following equation: $V_{out}$ for FIG. 5 equals $2 \times V_{out}$ for FIG. 4. It can be seen that the addition of diodes 56 and 58 and switch 60 has doubled the output voltage when comparing FIG. 5 with FIG. 4. If the switch 60 of FIG. 5 is thrown to the opposite position than shown in FIG. 5, this reduces the output voltage of FIG. 5 to that of FIG. 4, since diodes 56 and 58 are back to back and merely appear as an open circuit.

It can be seen that the system of FIG. 5 is a dual voltage supply in which the output voltage with the switch 60 in the position shown is twice that which is available when the switch is in the position opposite to that shown in FIG. 5. It can also be seen that the circuit of FIG. 5 is essentially a standard bridge configuration wherein the diodes 50, 54, 56 and 58 are conventionally employed as in a typical fullwave power supply. Therefore, the only additional components of the system of FIG. 5 over that of a standard fullwave power supply are the diode 52 and switch 60. With the simple addition of these two components, a dual voltage supply is provided.

Figure 6:
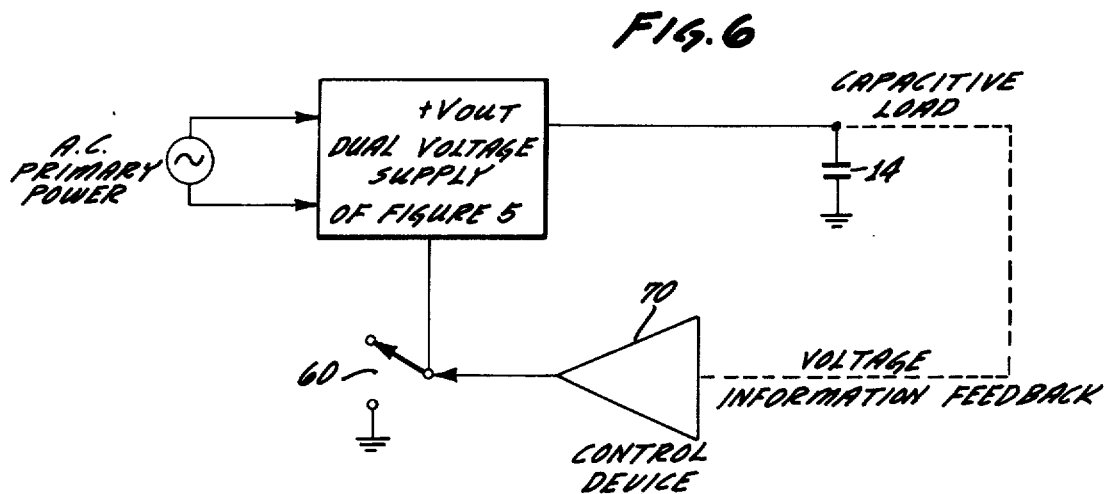
FIG. 6 illustrates the application of the switching matrix of FIG. 5 to provide for step charging of a capacitor.

A typical application of the dual voltage supply of FIG. 5 is illustrated in FIG. 6, wherein the dual voltage supply is used to provide for step charging of a capacitor to produce the advantages described above with reference to FIGS. 1 through 3. Specifically in FIG. 6, a voltage information feedback loop is employed with a control device 70 which opens the switch 60 when the voltage across the capacitor 14 is less than $V_{out}/2$ and closes the switch 60 when the voltage across the capacitor 14 equals or exceeds $V_{out}/2$. The charging efficiency is thereby maximized by reducing the mismatch between the supply voltage and the capacitor voltage. In addition, when the supply is operating in the half-voltage mode, the lower effective transformer turns ratio of the transformer in the dual voltage yields twice the output current. The capacitor charge rate is thereby doubled.

FIG. 7 illustrates the use of the two-step charging and the switching system shown in FIGS. 1 through 6 as part of a rechargeable strobe light. The strobe light of FIG. 7 includes a pair of 3-volt batteries 100 and 102, which are rechargeable and which provide for a high storage capability. A switch 104 is used to provide for an on/off control of the strobe light. A charging input 106 is used to provide charging of the batteries 100 and 102 through a diode 109. The diode 109 prevents the batteries from discharging and also provides the proper charge path during the charging of the batteries. In order to use the strobe, an external contact closure must be provided between the terminal 106 and a second terminal 108. This contact closure is provided in cameras designed for flash photography.

The strobe includes an integrated circuit block 110 which includes a plurality of transistors 112, 114, 116, 118 and 120. A plurality of resistors 122, 124, and 126 are used as a voltage divider circuit to provide biasing of the transistor 112, which inhibits the strobe from flashing until the referenced external contact closure occurs. Transistors 120 and 118 are biased directly from the batteries. A zener diode 128 and resistor 130 provide biasing of the transistors 114 and 116. The emitter of the transistor 132 is also biased from zener diode 128 through a resistor 134.

The base of the transistor 132 and the collector of the transistor 114 are interconnected through a diode 136 and a resistor 138. The collector of the transistor 132 is coupled resistor 138. The collector of transistor 132 is coupled directly to the emitter of the transistor 140 and through a diode 142 to the base of the transistor 144. The base of the transistor 140 is interconnected through a resistor 146 to ground and is coupled through diodes 148 and 150 to a pair of push-pull transistors 152 and 154. The transistor 132 is interconnected through a pair of diodes 157 and 158 to the collectors of the transistors 152 and 154. A step-up transformer 156 is interconnected with transistors 152 and 154 to form a push-pull oscillator with a feedback from winding points 4, 5 and 6. If the point 5 is grounded and the oscillator is started, then d-c is converted to alternating current using the primary winding between points 7 and 9 (having the center tap 8) and the secondary winding between points 1 and 3 (having the center tap 2).

The output of the step-up transformer 156 is applied to a fullwave rectifier 160 including diodes 162 through 168. A diode 170 and a pair of capacitors 172 and 174 are used in association with the secondary winding of the step-up transformer 156. A triac switch 176 is used as a switching element for the fullwave rectifier 160.

The output of the fullwave rectifier 160 drives a capacitor bank 178 including a plurality of high-voltage capacitors. The output of the capacitor bank 178 is applied across a strobe light 180 which may be, for example, a xenon light. A high-voltage tickler coil 182 is used to start the ionization of the xenon tube and an SCR 184 controls the production of a pulse from the high voltage coil 182. Specifically, the SCR 184 controls the discharging of capacitor 186 through the high voltage coil 182. The firing of the SCR is controlled by the output of transistor 112 which is coupled through diode 188 and across a noise suppression resistor 190.

In order to insure that the capacitor 186 is properly charged, the capacitor bank 178 provides charging of the capacitor 186 through a plurality of resistors 192, 194, 196 and 198, which resistors operate as a voltage divider. These resistors 192 through 198 also operate in association with a plurality of neon lamps 200, 202, 204 and 206 to control the operation of the transistors 112 through 120. Resistors 208 and 210 are also associated with this control portion of the circuit. Finally, resistor 214 provides intercoupling between the control portion of the circuitry and the triac 176.

The oscillator portion of the circuitry operates as follows: Transistor 132 is used to start the oscillator by initially turning on transistor 140, which provides base drive to push-pull oscillator transistors 152 and 154. This base drive in conjunction with feedback from points 4 and 6 of the transformer 156 turns on the push-pull oscillator. Once the oscillator has been turned on, feedback from the referenced points 4 and 6 provides reverse bias to the base of transistor 142, which turns off. Transistor 132 then turns on transistor 144, which effectively grounds point 5 of transformer 156, thereby permitting adequate base drive to oscillator transistors 152 and 154 and ensuring full power operation of the oscillator.

Oscillator transistors 152 and 154 switch direct current from the batteries through alternating sides of the primary windings of transformer 156 (from point 8 to point 7 and from point 8 to point 9). The transformer 156 provides a step-up of this induced a-c voltage and the stepped-up voltage is applied to the fullwave rectifier 160. The capacitors 172 and 174 are used to slow the rise time of the voltage across the triac 176 so that the triac is not turned on inadvertently. The diode 170 is used to prevent the center tap from being grounded when the entire output is used.

The diodes 162 through 168 and diode 170 in combination with the switching triac 176 operate in the same fashion as shown with reference to FIGS. 4 and 6. Initially, diodes 166 and 168 are used to rectify current from each half of the output winding so that a lower turns ratio is used to provide the higher current at the lower voltage to produce more efficiency and speed in the charging of the capacitor bank 178. When the triac switch 176 is turned on, the diodes 162 and 164 are part of the circuit so that all of the secondary winding is used. At this time, the full output voltage is produced from the fullwave rectifier with the lower current to charge the capacitor bank 178. The two-step charging increases the overall efficiency and speed of charging of the capacitor bank 178.

In order to fire the strobe light 180, the sync contact is closed to short circuit the inputs 106 and 108. When the sync contact is closed, transistor 112 is turned off since its base is grounded. When transistor 112 is turned off, voltage on the gate of the SCR 184 rises and the SCR fires. When the SCR 184 fires, the capacitor 186 discharges to produce a pulse through the high voltage coil 182 which, in turn, produces a high voltage pulse through the winding around the xenon light 180. This high voltage pulse ionizes the xenon light 180 and acts as a trigger to discharge capacitor bank 178 through the xenon light 180. Stray inductance in the high voltage coil 182 causes capacitor 186 to charge in the opposite direction and turns off the SCR 184. The capacitor 186 is then recharged from the capacitor bank 178 through the resistors 192 through 198 acting as a voltage divider.

The neon light 200 is used to ensure at least 60 volts on the capacitor bank, since the neon light operates as a very high resistance to disconnect the circuit from the capacitor bank 176 when the voltage is 60 volts or below. This prevents the capacitor bank from electrically deforming, which could cause a subsequent failure. The neon light 202 is an external light which is visible, and when the voltage on the capacitor bank is at 300 volts or above, the neon light 202 fires. This visible light indicates that the capacitor bank is charged to 80 percent of maximum, and at this point the strobe would be ready for refiring.

The control portion of the circuit for controlling the switching of the triac 176 uses the neon light 204. This switching of the triac occurs when the voltage on the capacitor bank reaches 180 volts. At this time, the neon light 204 fires and transistor 118 is turned on. When transistor 118 is turned on, then transistor 120 is on and the triac is also turned on. When the triac is on, the full secondary winding of the transformer 156 is used so as to shift to the higher voltage output.

Finally, when the voltage on the capacitor bank reaches 350 volts, then the neon light 206 fires and transistor 116 is turned on. When transistor 116 is on, then transistor 114 is off, since its base would be grounded. When transistor 114 is off, then transistor 132 is off, which, in turn, turns off transistor 144, and then the point 5 of the transformer 146 is no longer grounded. At this time, there is no base drive current path for transistors 152 and 154.

The oscillator is therefore disconnected so that it does not continue to charge the capacitors, thereby maintaining the capacitor voltage at the desired level and additionally conserving the charge on batteries 100 and 102.

It can be seen, therefore, that the present invention provides for two-step charging of the capacitor bank using a simple addition of a diode and a switch to a normal, fullwave rectifier circuit. The strobe light, therefore, operates to provide a large number of flashes from low-voltage, rechargeable batteries, and with the recovery between each flash rapid due to the efficiency of charging of the capacitor bank. The circuit uses a plurality of neon lights which, when they fire, provide control of the stepping of the voltages from a first level to a second level to improve the efficiency and speed of the charging and with the charging discontinued when the voltage on the capacitor bank reaches a maximum level. In addition, the capacitor bank is disconnected when the voltage falls below a minimum level to prevent electrical deforming of the batteries. The low voltage from the batteries is used to drive a push-pull oscillator which, in turn, is stepped up by a step-up transformer and rectified to a high d-c voltage for charging the capacitor bank. The combination of the low voltage, rechargeable batteries provides for an efficient and compact strobe light which may be used underwater without excess bulk and has a large capacity of flashes with a fast recovery time.

Although the invention has been described with reference to a particular embodiment, it is to be appreciated that various adaptations and modifications may be made and the invention is only to be limited by the appended claims.

I claim:

1. A system for charging a capacitor to a predetermined voltage level, including
   first means for providing a first voltage level less than the predetermined voltage level,
   second means coupled to the first means and to the capacitor for coupling the first voltage level to the capacitor for charging the capacitor,
   third means coupled to the capacitor for monitoring the voltage across the capacitor for detecting when the voltage across the capacitor has reached a substantial portion of the first voltage level,
   fourth means for providing a second voltage level higher than the first voltage level,
   fifth means coupled to the third and fourth means and to the capacitor for coupling the second voltage level to the capacitor in accordance with the detection of the third means to charge the capacitor to the second voltage level, and
   the voltage levels provided by the first and fourth means are provided by a charging circuit including a full wave bridge rectifier driven from the secondary of a transformer having a center tap and additionally including a diode connected between the center tap and a reference potential and a switch connected between the bridge rectifier and the reference potential to provide the first voltage level when the switch is open and the second voltage level when the switch is closed.

2. The system of claim 1 wherein the first voltage level is approximately one-half of the second voltage level and the second voltage level is equal to the predetermined voltage level.

3. The system of claim 1 wherein the charged capacitor is used in a strobe light to power a flash lamp.

4. The system of claim 1 wherein the charged capacitor and the charging circuit are included within a strobe light having a flash lamp and with flash lamp energized by discharging the capacitor through the lamp.

5. A system for providing a two level d-c voltage from an a-c source, including
   a transformer having a secondary winding including a center tap for supplying an a-c voltage,
   a bridge rectifier coupled across the secondary winding for rectifying the a-c voltage through at least a portion of the bridge rectifier to provide an output voltage at an output terminal,
   a diode coupled between the center tap of the secondary winding and a reference potential and
   a switch coupled between the bridge rectifier and the reference potential to provide at the output terminal a first voltage level when the switch is open and to provide at the output terminal a second voltage level higher than the first voltage level when the switch is closed.

6. The system of claim 5 wherein each half of the secondary winding is used on alternate half cycles of the a-c source when the switch is open to provide the first voltage level at a first current value and wherein the whole secondary winding is used on each cycle of the a-c source when the switch is closed to provide the second voltage level at twice the value of the first voltage level but at a second current value one-half of the first current value.

7. The system of claim 5 additionally including a capacitor and wherein the first voltage level is used to charge the capacitor until the voltage across the capacitor reaches a predetermined level at which time the switch is closed and the second voltage level then used to charge the capacitor.

8. The system of claim 7 additionally including a flash lamp and wherein the capacitor is used to flash the lamp by discharging the capacitor through the lamp.

9. The system of claim 8 additionally including means to recharge the capacitor using the two voltage levels after each flash of the flash lamp.

10. A portable strobe light for providing an output light from a light source, including a portable source of electric energy, first means coupled to the source of electric energy for providing a stepped voltage output having at least two voltage levels, capacitive means coupled to the first means for receiving the stepped voltage output to charge the capacitive means in the voltage steps, second means coupling the capacitive means to the light source for discharging the capacitive means through the light source to produce output light energy, and the portable source of electric energy including a transformer receiving a-c voltage and having a secondary winding with a center tap and with the first means including a bridge rectifier driven from the secondary of the transformer and with diode connected between the center tap and a reference potential and with a switch connected between the bridge rectifier and the reference potential to provide a first voltage step when the switch is open and a second voltage step when the switch is closed.

11. The portable strobe light of claim 10 wherein each half of the secondary winding is used on alternate half cycles of the a-c voltage when the switch is open to provide the first voltage step at a first current value and wherein the entire secondary winding is used on each cycle of the a-c voltage when the switch is closed to provide the second voltage step at twice the value of the first voltage step but at a second current value one-half of the first current value.

12. The portable strobe light of claim 10 wherein the portable source of electric energy includes at least one rechargable battery.

13. The portable strobe light of claim 10 additionally including means to control the application of the various voltage steps to the capacitive means in accordance with the voltage level across the capacitive means.

14. The portable strobe light of claim 13 additionally including means to recharge the capacitive means with the voltage steps after each discharge of the capacitive means through the light source.

* * * * *